A. B. LYON.
PANTOGRAPH.
APPLICATION FILED NOV. 17, 1910.
1,014,012.
Patented Jan. 9, 1912.
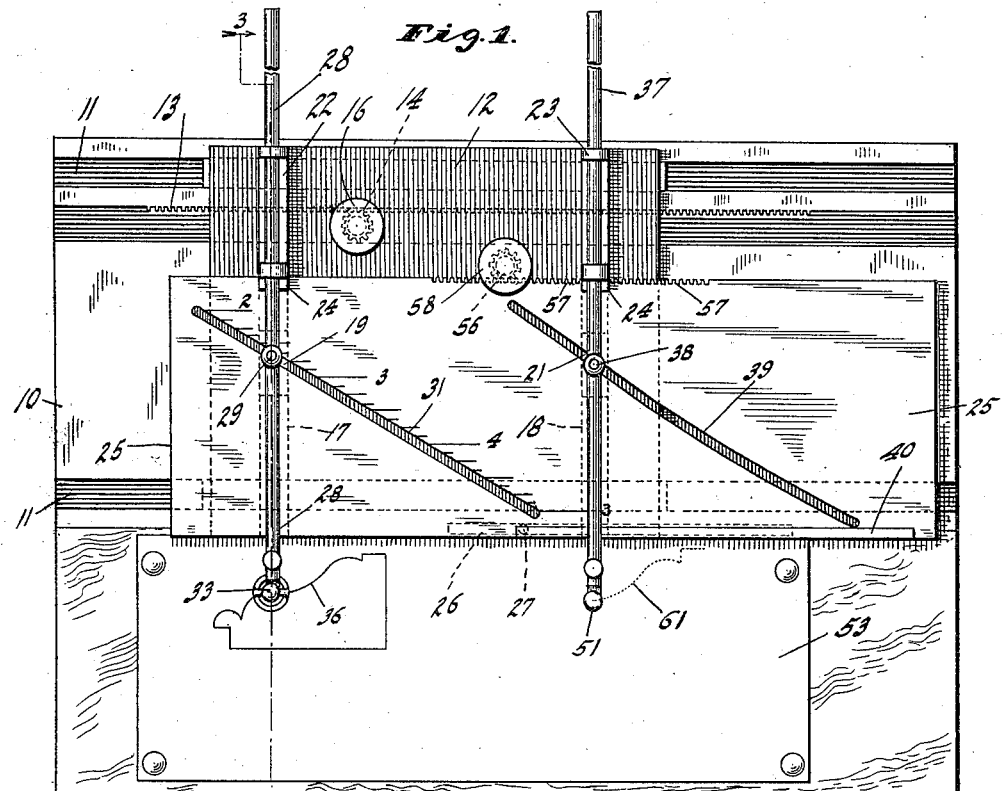
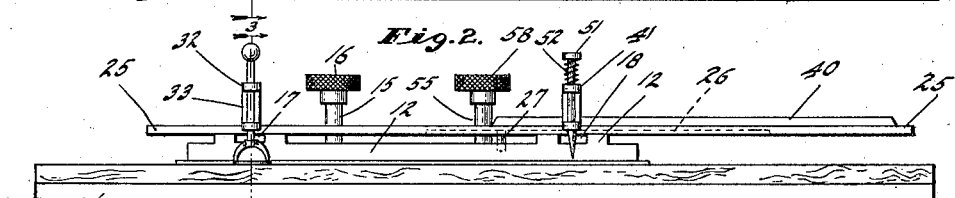
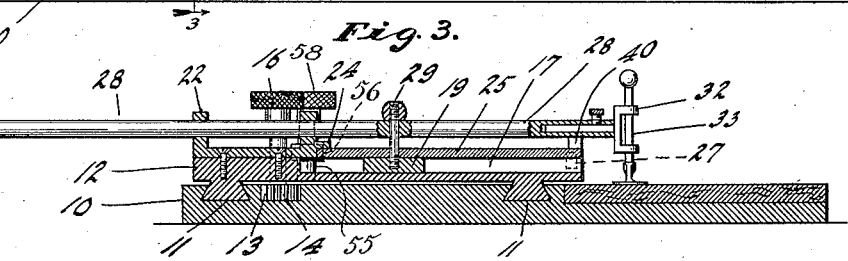
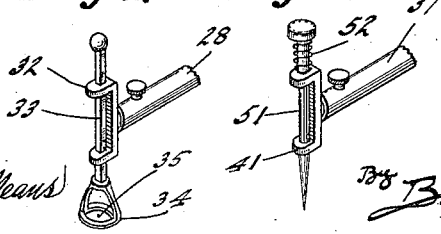
Witnesses
Frank A. Fahl
Thomas W. McMeans
Inventor
Alfred B. Lyon,
By Bradford Hood.
Attorneys

UNITED STATES PATENT OFFICE.

ALFRED B. LYON, OF INDIANAPOLIS, INDIANA.

PANTOGRAPH.

1,014,012.  Specification of Letters Patent.  Patented Jan. 9, 1912.

Application filed November 17, 1910. Serial No. 592,907.

*To all whom it may concern:*

Be it known that I, ALFRED B. LYON, a citizen of the United States, residing at Indianapolis, in the county of Marion and State of Indiana, have invented a new and useful Pantograph, of which the following is a specification.

In the manufacture of moldings and other articles by means of a rotary cutter in which the cutting blade is carried tangentially relative to the axis of the cutter head, it is well known that the contour of the cutting edge does not exactly correspond to the contour of a right-angled section of the molding or other article and a considerable degree of skill is required on the part of the cutter grinder to properly form the cutter for any particular type of molding.

The object of my present invention is to produce a simple pantograph by means of which the necessary contour for the cutting edge of the cutter may be quickly and accurately established for any particular contour of molding, the tool being universal within its range of adjustment for any particular cutter head.

The accompanying drawings illustrate my invention.

Figure 1 is a plan of my protractor arranged in operative position for determining the desired contour of the cutting edge of the cutter capable of producing the molding illustrated; Fig. 2 is an elevation; Fig. 3 a section on lines 3—3 of Figs. 1 and 2; Fig. 4 a perspective detail of a pattern follower head of desirable form, and Fig. 5 a perspective view of a marker head of desirable form.

In the drawings, 10 indicates a suitable supporting board or platform provided with guideways 11, 11, in which is mounted a base plate 12 movable longitudinally of the support in the guideways 11. This plate 12 may be shifted in its guides by hand if desired but I prefer to provide means by which more delicate movements of the base plate may be accomplished and for this reason I provide the support 10 with a longitudinal rack 13 adapted to be engaged by a pinion 14 carried by shaft 15 journaled in base plate 12 and provided with a knurled operating head 16. Base plate 12 is provided with a pair of transverse guideways 17 and 18 which extend preferably at right angles to the lines of movement of the base plate on the support 10. In the guideway 17 is mounted a block 19 capable of sliding longitudinally in the guideway and in guideway 18 is mounted a similar block 21. Secured to the upper face of base plate 12 are two similar brackets 22 and 23 each provided at its forward edge with an overhanging lip 24. Slidably mounted upon base plate 12 with one edge beneath lips 24 is a gage plate 25, the opposite edge having a groove (shown in dotted lines in Figs. 1 and 2) formed in its under face in order to receive the pin 27 carried by the base plate 12, the construction being such that the gage plate may slide upon the base plate 12 transversely to the guideways 17 and 18.

Mounted in bracket 22 so as to slide parallel with guideway 17 is a rod 28 which is provided at an intermediate point with a pin 29 projected downwardly into block 19, the said pin 29 passing through a gage slot 31 formed through the gage plate 25, the arrangement being such that longitudinal movement of the gage plate will cause block 19 to traverse guideway 17.

Mounted in one end of the rod 28 is a head 32 which carries a vertically movable stem 33 which, at its lower end, carries a transparent plate 34 provided with a sight opening or indicator spot 35 which may be caused to travel along the pattern line 36 mounted in any suitable manner upon the support 10, either in the form of a drawing or a small cross section of the desired molding.

Mounted in the bracket 23 so as to slide therethrough in line with guideway 18 is a marker rod 37 provided at an intermediate point with a pin 38 which is projected down into block 21, the said pin 38 passing through a slot 39 formed through gage plate 25. One end of this rod 37 passes freely over a supporting bridge or bar 40 carried by plate 25 and at its outer end carries a head 41 in which is mounted a vertically reciprocable marker 51 which may be conveniently in the form of a stylus, a spring 52 being provided to keep it normally out of engagement with the pattern sheet 53.

Gage plate 25 may be shifted upon the base plate 12 either by hand or by any other suitable means but in order to obtain delicacy of movement I journal a shaft 55 in the base plate 12 and provide said shaft with a pinion 56 which meshes with a rack 57 formed in the adjacent edge of the gage plate 25. Shaft 55 is provided with a suitably knurled operating head 58.

A separate gage plate will be provided for each size or type of cutter head and the slot 37 will differ from slot 31 to an extent necessary to compensate for the angle of departure of the cutter from radial.

The simplest arrangement and relation of these two slots is obtained when slot 31 is straight and in that case slot 39 will, between its ends, depart from a straight line as is clearly indicated in the drawings, the amount of this departure varying with the angle of set of the cutter.

In operation pattern sheet 53 will be placed upon the support 10 and the pattern of the desired molding 36, full size, laid upon the pattern sheet, either by drawing or by a short cross section of the molding. Base plate 12 will then be shifted in its guides and the gage plate 25 shifted in its guides until the gage point 35 is brought to one end of the desired contour line of the pattern. The marker 51 will then be depressed so as to produce a mark upon the pattern sheet. The base plate 12 will then be shifted slightly and the gage plate 25 correspondingly shifted slightly so as to bring the gage point 35 to another position closely adjacent the first upon the pattern line 36 and the marker will again be depressed. This operation will be repeated as many times as may be necessary, depending upon the desired contour, until the cutter pattern line 61 is fully indicated. The cutter pattern line 61 will differ from the desired contour line 36 by an amount corresponding to the difference between the two slots 31 and 37 and consequently the cutter pattern line 61 will form a pattern which will serve as a guide for the cutter grinder so that when the cutter has its cutting edge brought into conformance with the cutter pattern line 61 that cutter will then produce, when properly mounted in its cutting head, the contour 36.

I claim as my invention:

1. A cutter pantograph comprising a support, a base plate mounted on said support, means by which said base plate may be shifted on the support, a gage plate movably mounted on the base plate, means by which said gage plate may be shifted upon the base plate, a pattern follower structure mounted upon the base plate and movable relative thereto, a marker structure mounted upon the base plate and movable relative thereto, and interengaging means between the gage plate, the pattern follower structure and the marker structure differentially affecting said pattern follower structure and marker structure, whereby movement of the gage plate to correspond to movement of the pattern follower will move the marker to a different extent to compensate for the angle of position of the cutter.

2. A cutter pantograph comprising a support, a base plate mounted on said support, a gage plate movably mounted on the base plate, a pattern follower structure mounted upon the base plate and movable relative thereto, a marker structure mounted upon the base plate and movable relative thereto, and means carried by the gage plate for engaging the pattern follower structure and the marker structure differentially, whereby movement of the gage plate to correspond to movement of the pattern follower structure will move the marker structure to a different extent to compensate for the angle of position of the cutter.

3. A cutter pantograph comprising a support, a base plate slidably mounted in suitable guides on said support, means by which said base plate may be shifted in its guides, a gage plate slidably mounted upon the base plate, means by which said gage plate may be shifted upon the base plate, a pattern follower structure carried by the base plate and slidable transversely of the gage plate, a finger carried by said pattern follower structure and projecting into an angularly arranged slot in the gage plate, a marker structure carried by the base plate and slidable transversely of the gage plate, and a finger carried by the marker structure and projecting into a slot carried by the gage plate, said last mentioned slot having a different character from the first mentioned slot to compensate for the angularity of the cutter.

4. A cutter pantograph comprising a support, a base plate slidably mounted in suitable guides on said support, a gage plate slidably mounted upon the base plate, a pattern follower structure carried by the base plate and slidable transversely of the gage plate, a finger carried by said pattern follower structure and projecting into an angularly arranged slot in the gage plate, a marker structure carried by the base plate and slidable transversely of the gage plate, and a finger carried by the marker structure and projecting into a slot carried by the gage plate, said last mentioned slot having a different character from the first mentioned slot to compensate for the angularity of the cutter.

In witness whereof, I have hereunto set my hand and seal at Indianapolis, Indiana, this tenth day of November, A. D one thousand nine hundred and ten.

ALFRED B. LYON. [L. S.]

Witnesses:
 ARTHUR M. HOOD,
 THOMAS W. MCMEANS.

Copies of this patent may be obtained for five cents each, by addressing the "Commissioner of Patents, Washington, D. C."